United States Patent [19]
Lubkeman

[11] Patent Number: 5,662,372
[45] Date of Patent: Sep. 2, 1997

[54] FLEXIBLE WEATHER PROTECTIVE VEHICLE COVER STRUCTURE

[76] Inventor: Arnold F. Lubkeman, 112 Hill Top Dr., McHenry, Ill. 60056

[21] Appl. No.: 746,097

[22] Filed: Nov. 6, 1996

[51] Int. Cl.$^6$ ................................................ B60J 7/20
[52] U.S. Cl. .................. 296/136; 296/78.1; 150/166
[58] Field of Search .................. 296/78.1, 136; 150/166, 167

[56] References Cited

U.S. PATENT DOCUMENTS

| | | |
|---|---|---|
| D. 322,054 | 12/1991 | Reiter . |
| 1,802,807 | 4/1931 | Davis . |
| 3,884,523 | 5/1975 | Allen . |
| 3,984,142 | 10/1976 | Van Valkenburgh . |
| 5,052,738 | 10/1991 | Li . |
| 5,562,139 | 10/1996 | Cseri ................................ 296/136 X |

*Primary Examiner*—Joseph D. Pape
*Attorney, Agent, or Firm*—Meroni & Meroni

[57] ABSTRACT

A flexible weather protective vehicle cover structure including a vehicle cover section sized and positionable to cover the motorcycle-like vehicle for protectively covering a stationary at least two-wheeled motorcycle-like vehicle with and without a rider thereon. The vehicle cover section having an outer side and an underneath side. Rider entry door arrangement located in the vehicle cover section for opening and sealing the vehicle cover section to enable ingress and egress of the rider when the flexible weather protective vehicle cover structure is positioned to cover the motorcycle-like vehicle. A rider cover section including a rider aperture located in the vehicle cover section at a position overlying a seat of the motorcycle-like vehicle. A rider aperture edge located adjacent a circumference of the rider aperture. A poncho-like member sized to fit over an upper torso portion of the rider. A bottom portion of the poncho-like member circumferentially sealingly connected to the rider aperture edge. The rider aperture being adapted to permit entry of the rider from the underneath side of the vehicle cover section into the poncho-like member and thereby protectively cover the motorcycle-like vehicle and the rider. And, rider aperture sealing arrangement enabling opening and sealing of the rider aperture to prevent weather elements from contacting the motorcycle-like vehicle when the flexible weather protective vehicle cover structure is positioned to cover the motorcycle-like vehicle without a rider thereon.

20 Claims, 8 Drawing Sheets

FLEXIBLE WEATHER PROTECTIVE VEHICLE COVER STRUCTURE

BACKGROUND OF THE INVENTION

1. Field of the Invention

The present invention relates generally to a vehicle cover structure. More specifically, it relates to a flexible weather protective vehicle cover structure for protectively covering a stationary motorcycle-like vehicle with and without a rider thereon.

2. Description of the Prior Art

Various motorcycle-like vehicle covers exist in the prior art but none offer the features and combination of features that my Flexible Weather Protective Vehicle Cover Structure embodies. In particular, my invention can serve two related yet distinct functions, namely, as a additional motorcycle-like vehicle cover for the vehicle alone and as a unique motorcycle-like vehicle and rider cover for both the vehicle and the rider. Further, both of these functions can be achieved while maintaining the integrity of continuously protectively covering the vehicle through the implementation of at least the components hereafter known as a rider entry door and a rider aperture flap. Also my invention provides instant rain and weather protection for the rider with short term storage capability.

Some examples of prior art devices include U.S. Pat. No. 3,884,523 issued to Brian S. Allen, U.S. Design Pat. No. Des. 322,054 issued to Klaus Reiter and U.S. Pat. No. 5,052,738 issued to Ming-Bin Li. The Allen patent discloses a motorcycle cover compactly storable in a seat compartment of the motorcycle. This cover has no way of simultaneously covering a rider and the vehicle to protect both from weather elements. Also, there is no means for ingress and egress of the rider under the assembled cover. Additionally, this patent does not include other advantages and features of my invention.

The Reiter patent discloses a specific design for a type of motorcycle cover. This patent suffers from some of the same problems as the Allen patent in additional to its own deficiencies such as being configured for a particular type of motorcycle vehicle.

Finally, the Li patent discloses another type of motorcycle vehicle cover. Again, this patent suffers from some of the same problems as the Allen patent in additional to its own deficiencies such as, having to be fixedly mounted to the motorcycle vehicle before it can be utilized and having no means for ingress and egress of the rider under the cover once it is assembled over the motorcycle without compromising the integrity of a continuously protectively covered vehicle. Additionally, neither the Li patent nor any other known prior art discloses a poncho-like member configured and sized to protectively cover the upper torso portion of the rider, and this device does not include the other advantages and features of my invention as disclosed and claimed hereafter.

These and other types of vehicle cover structures disclosed in the prior art do not offer the flexibility and inventive features of my Flexible Weather Protective Vehicle Cover Structure. As will be described in greater detail hereinafter, the Flexible Weather Protective Vehicle Cover Structure of the present invention differs from those previously proposed.

SUMMARY OF THE INVENTION

According to my present invention I have provided a flexible weather protective vehicle cover structure including a vehicle cover section and a rider cover section for a stationary at least two-wheeled motorcycle-like vehicle with and without a rider thereon. The vehicle cover section comprises the vehicle cover section being sized and positionable to cover the motorcycle-like vehicle. The vehicle cover section has an outer side and an underneath side. A rider entry door is located in an upper edge of the vehicle cover section to enable ingress and egress of the rider. The rider entry door includes a water tight door closure member for opening and sealing the rider entry door when the flexible weather protective vehicle cover structure is positioned to cover the motorcycle-like vehicle. The water tight door closure member is from the group consisting of a first hook and loop type fastener and a first zipper. The water tight door closure member is also operable from the outer side and the underneath side of the vehicle cover section. The rider over section comprises a rider aperture located in the vehicle cover section at a position overlying a seat of the motorcycle-like vehicle when the flexible weather protective vehicle cover structure is positioned to cover the motorcycle-like vehicle. A rider aperture edge is located adjacent a circumference of the rider aperture. A poncho-like member is sized to fit over an upper torso portion of the rider. The poncho-like member includes a bottom portion. The bottom portion of the poncho-like member is circumferentially sealingly connected to the rider aperture edge. The rider aperture is adapted to permit entry of the rider from the underneath side of the vehicle cover section into the poncho-like member and thereby protectively cover the motorcycle-like vehicle and the rider.

According to important features of my invention I have also provided the rider cover section further comprising a rider aperture flap. The rider aperture flap is sized to cover the rider aperture. The rider aperture flap is connected adjacent the rider aperture edge. A water tight flap closure member is connected coextensive with the rider aperture flap and the rider aperture edge to enable opening and sealing of the rider aperture by positioning the rider aperture flap in a sealed closed position when the poncho-like member is located adjacent the underneath side of the vehicle cover section. Also, the water tight flap closure member being from the group consisting of a second hook and loop type fastener and a second zipper.

Another feature of my invention relates to a rider entry door flap connected adjacent the rider entry door to aid in sealing closed the rider entry door when the rider entry door is positioned to seal closed the vehicle cover section, and the rider entry door flap being positioned to aesthetically hide the elongated slit and door closure member.

Still another feature of my invention concerns the poncho-like member includes a hood for covering a head portion of the rider. The hood has a front opening for permitting access of the rider's face to an outside environment. A third zipper is located in the poncho-like member adjacent the front opening and extending a distance vertically down the poncho-like member. The third zipper is operable from both an inside and an outside position relative to the poncho-like member and the third zipper enables the hood to be draw around the head portion as desired. According to important features of my invention I have also provided the vehicle cover section including a heat resistant material portion located longitudinally along the underneath side of the vehicle cover section for shielding the vehicle cover section from an engine and an exhaust system of the motorcycle-like vehicle. Additionally, my invention may include at least one vent opening located in the vehicle cover section adjacent the engine to enable heat from the engine of the motorcycle-like vehicle to escape from the underneath side of the vehicle cover section to an outside environment.

Yet another feature of my invention I have provided is reflector means attached at an outer side of the vehicle cover section where the reflector means is for warning passer-bys of the location and stationary condition of the motorcycle-like vehicle positioned under the flexible weather protective vehicle cover structure with and without a rider thereon. Also, I have provided a container and the flexible weather protective vehicle cover structure being collapsible to be compactly stored in a rolled position inside the container.

According to still further features of my invention I have also provided a bottom edge of the vehicle cover section including elastic gathering means for securing the vehicle cover section to the motorcycle-like vehicle by resiliently gathering the bottom edge about a lower half of at least two of the wheels of the motorcycle-like vehicle when the motorcycle-like vehicle is with or without the rider. Also, my invention may include a pair of grommets located in the bottom edge of the vehicle cover section and a strap-type fastener engageable with each of the pair of grommets and underling the motorcycle-like vehicle to thereby aid to further secure the vehicle cover section to the motorcycle-like vehicle when the motorcycle-like vehicle is without the rider.

Other objects, features and advantages of my invention will become more readily apparent upon reference to the following description when taken in conjunction with the accompanying drawings, which drawings illustrate several embodiments of my invention.

DETAILED DESCRIPTION OF THE PREFERRED EMBODIMENT

Figure 1:
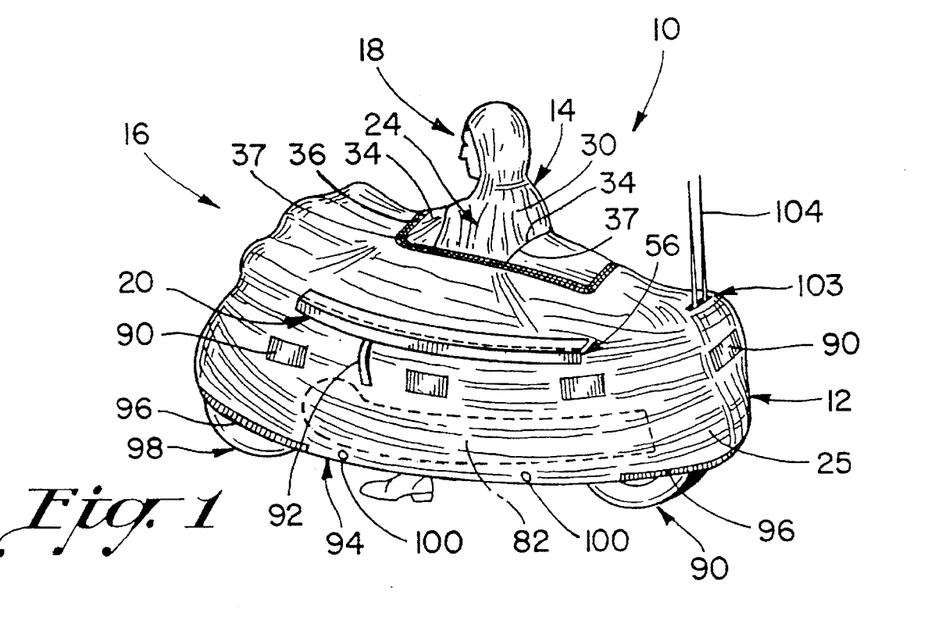
FIG. 1 is a left side perspective view of the preferred embodiment of my flexible weather protective cover structure positioned to cover a motorcycle-like vehicle with a rider thereon where a rider aperture flap is in an unsealed opened position.

Referring now to the drawings, FIG. 1 shows my new and improved flexible weather protective vehicle cover structure 10 for a stationary motorcycle-like vehicle 16 with and without a rider 18 thereon. The vehicle cover structure includes a vehicle cover section 12 and a rider cover section 14. It should be understood that although excellent results are obtained when my invention is used with a two-wheeled motorcycle, it could be utilized with a three or four wheel motorcycle-like vehicle and still achieve the features and advantages of my claimed invention here. Also, my invention could employ more than one rider cover section (such rider cover section described further hereafter) to protectively cover more than one rider, as desired.

Turning to the components of the vehicle cover structure 10, the vehicle cover section comprises the vehicle cover section 12 being sized to cover the motorcycle-like vehicle 16. A rider entry door 20 enables ingress and egress of the rider into and out of the vehicle cover section. The rider entry door 20 is defined by an elongated slit 52. The slit 52 is preferably located at an upper edge of the vehicle cover section 12, although, it should be understood that the slit could be located anywhere in the vehicle cover section whereby the rider could still gain entry into the vehicle cover section.

Figure 7:
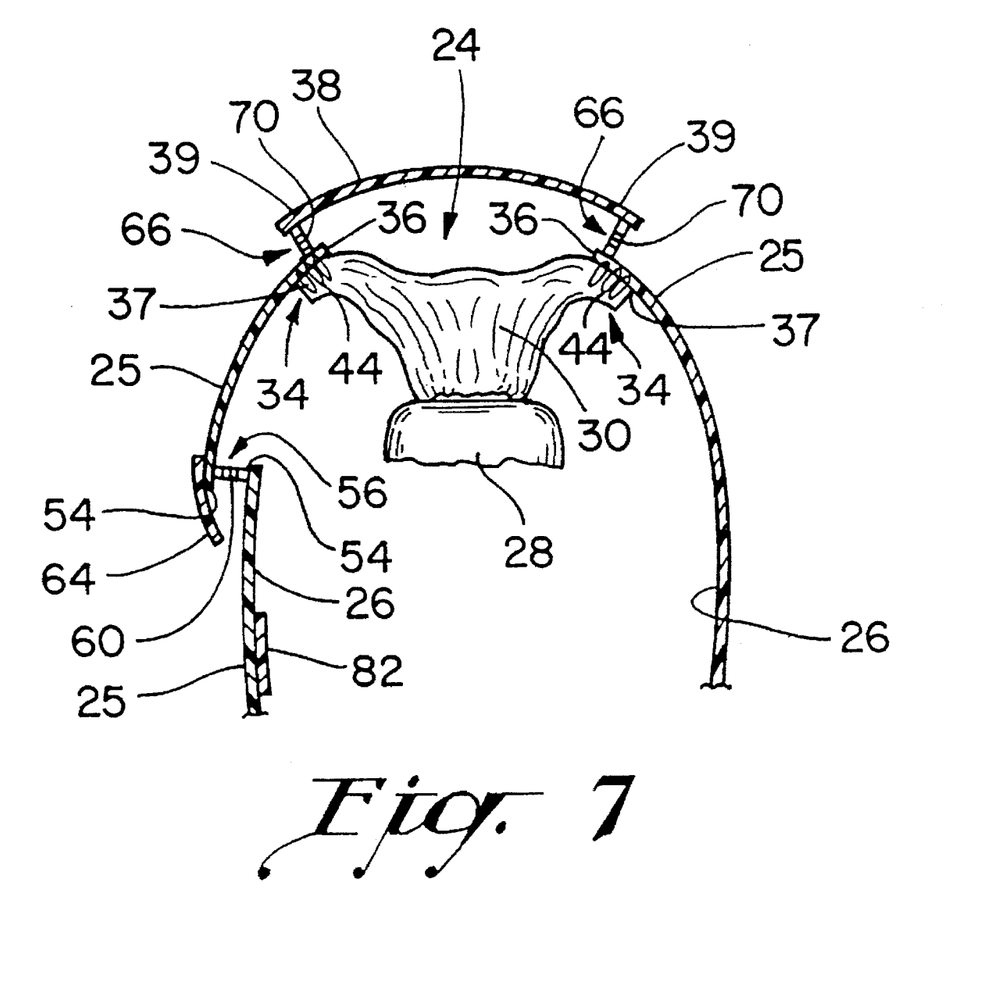
FIG. 7 is an exploded cut away cross-sectional view taken along the line 6—6 shown in FIG. 6, with zipper type water tight closure members.

A water tight door closure member 56 is connected coextensive with a pair of opposed slit edges 54 defined by the elongated slit 52. The door closure member facilitates opening and sealing of the rider entry door 20. In this way, the rider entry door can be positioned to seal closed the vehicle cover section 12 and prevent weather elements from contacting the motorcycle-like vehicle, both with and without a rider on the vehicle. At this time, I contemplate using a water tight door closure member from the group consisting of a first hook and loop type fastener 58 (the product commonly sold under the trademark "VELCRO" TM) and a first zipper 60. Excellent results are believed to be obtainable when the zipper 60 is used and in particular a heavy-duty synthetic plastic-type zipper (as shown in FIG. 7).

Regardless of the type of door closure member utilized, it is important that the door closure member be operable from both an outer side 25 and an underneath side 26 relative to the vehicle cover section. This feature is important to the practice of my invention in that my invention is contemplated to be operated by a single rider, if desired, without the assistance of another person. Thus, for the rider to be able to easily and reliably seal the rider entry door 20 after the rider enters into the vehicle cover section and into a poncho-like member 30 (described further hereafter) the rider must be able to seal the rider entry door from the underneath side 26 of the vehicle cover section.

Figure 2:
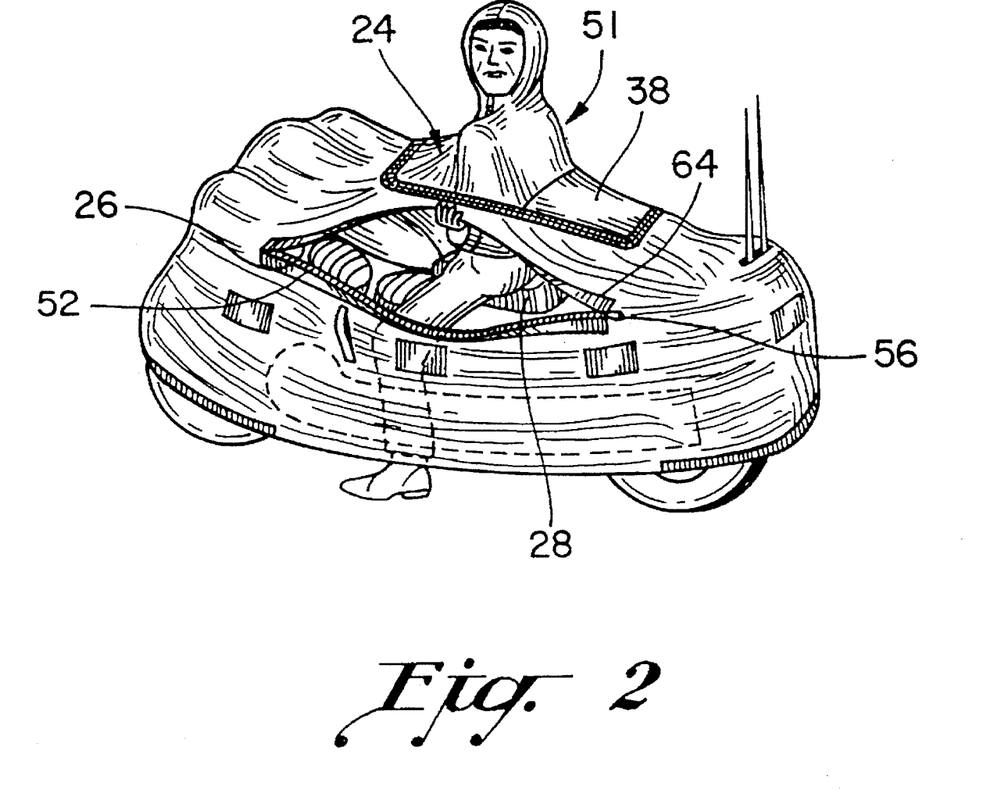
FIG. 2 is a left side elevational view of the embodiment shown in FIG. 1, just after the rider enters underneath the vehicle cover section and into the rider cover section.
Figure 8:
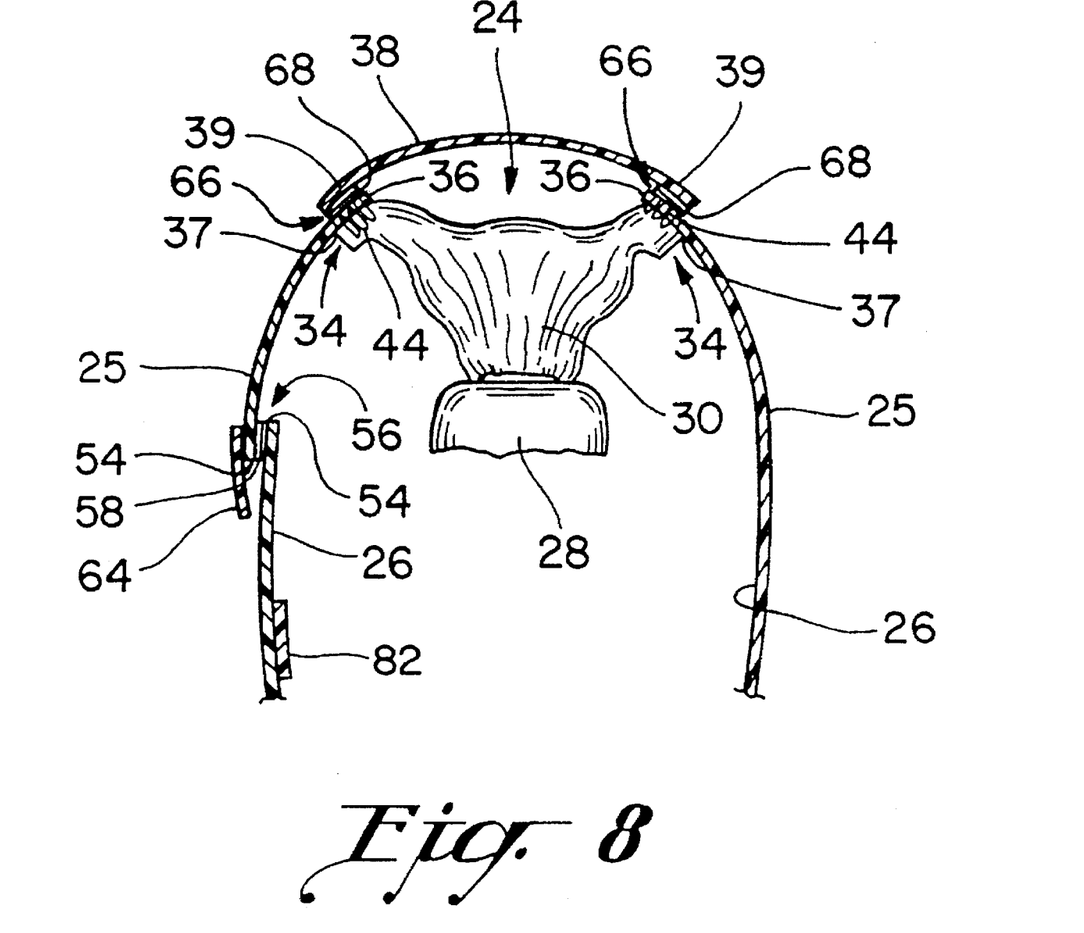
FIG. 8 is an exploded cut away cross-sectional view taken along the line 6—6 shown in FIG. 6, with "VELCRO" (TM) type water tight closure members.

Excellent results are further obtained in regards to the rider entry door 20 when the door includes a rider entry door flap 64. The flap 64 is connected adjacent at least one side of the elongated slit. The door flap 64 aids in sealing closed the rider entry door when the rider entry door is positioned to seal closed the vehicle cover section. Also, door flap 64 serves to aesthetically hide the elongated slit and door closure member simultaneously. The door flap 64 may be integrally connected with the vehicle cover section, i.e., an extension of the same material (as shown in FIG. 2), or it may be a separately connected piece (as shown in FIGS. 7 and 8).

The rider cover section 14 comprises a rider aperture 24 located in the vehicle cover section 12 at a position overlying a seat 28 of the motorcycle-like vehicle when the vehicle cover section is positioned to cover the motorcycle-like vehicle. A rider aperture edge 36 is defined by a circumference of the rider aperture. The rider cover section 14 further includes the poncho-like member 30 sized to fit over an upper torso portion of the rider. The poncho-like member includes a bottom portion 34. The bottom portion 34 of the poncho-like member is sealingly connected to the vehicle cover section at 37 adjacent to the rider aperture edge 36, as shown in detail in FIGS. 7 and 8. With the poncho-like member so connected to the rider aperture, the rider aperture is adapted to permit entry of the rider from the underneath side 26 of the vehicle cover section into the poncho-like member 30 and thereby protectively cover the motorcycle-like vehicle and the rider.

To further understand the practice of my invention, it is noted that the bottom portion 34 of the poncho-like member 30 is sealingly connected continuously at each point of a circumference of the bottom portion 34 to respective points on the rider aperture edge 36. In this way, the sealingly connected relationship creates a substantially water tight characteristic that prevents weather elements from contacting the motorcycle-like vehicle when the rider is seated on the vehicle underneath the vehicle cover structure 10. Consequently, one of the features of my invention is practiced whereby the rider 18 and the vehicle 16 are easily and reliably protected from the weather elements by a unitary vehicle cover structure not susceptible to the effects of wind, rain and other weather elements that would affect a two piece covering structure.

Figure 3:
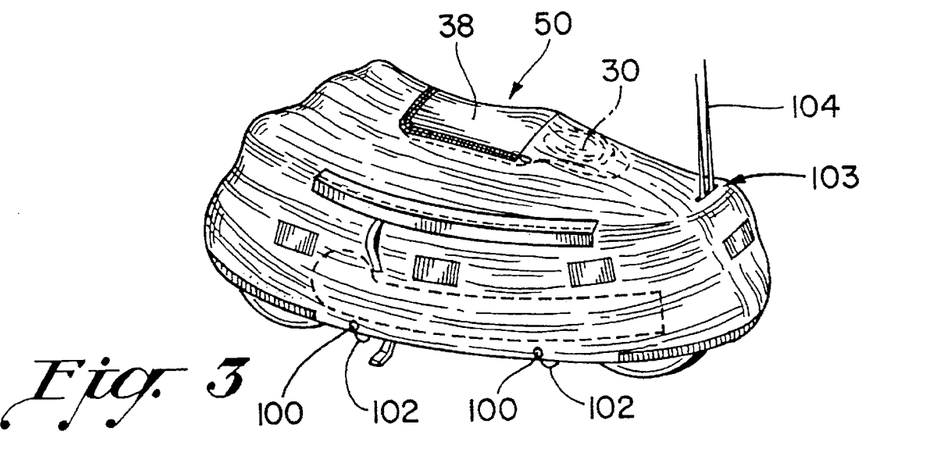
FIG. 3 is a left side perspective view of another embodiment of my flexible weather protective cover structure positioned to cover a motorcycle-like vehicle without a rider thereon and with a rider aperture flap in a sealed closed position.

Referring to another feature of my invention, I disclose a rider aperture flap 38 located adjacent the rider aperture 24. The flap 38 further includes a water tight flap closure member 66 connected coextensive with an outer edge 39 of the rider aperture flap and the rider aperture edge 36. In operation, the water tight flap closure member 66 enables opening and sealing of the rider aperture 24 by each point of the outer edge 39 being sealable with a corresponding opposed point of the rider aperture edge when the poncho-like member is located adjacent the underneath side of the vehicle cover section, i.e., at a position inside the vehicle cover section. Stated differently, closure member 66 enables the rider aperture flap to be positioned in a sealed closed position 50 to seal closed the vehicle cover section and prevent weather elements from contacting the motorcycle-like vehicle without a rider thereon, as seen in FIG. 3 among others.

At this time, I contemplate using a water tight flap closure member 66 from the group consisting of a second hook and loop type fastener 68 (the product commonly sold under the trademark "VELCRO" TM) and a second zipper 70. Excellent results are obtained when the second hook and loop type fastener commonly known as "VELCRO" TM is used.

In the preferred embodiment of my invention the rider aperture flap is integrally connected adjacent the rider aperture edge. Excellent results are obtained because the rider aperture flap 38 is conveniently formed from the vehicle cover section by cutting the rider aperture into the vehicle cover section, leaving at least the last side of the rider aperture uncut and integrally joined to the vehicle cover section. Then, when the rider aperture flap is positioned in an open unsealed position 51 to enable utilization of the rider cover section (as shown in FIG. 1), there is no risk of the flap 38 becoming disjointed from the vehicle cover structure. It should be understood however, that the rider aperture flap need not be integrally connected to the vehicle cover section. The flap could in fact be removably connected, utilizing the water tight flap closure member 66 on all outer edges of the flap, and this would still achieve the claimed features and advantages of my invention here. Also, the shape of configuration of the rider aperture is not critical, as long as the rider aperture is so configured to enable entry of the rider from the underneath side 26 of the vehicle cover section into the poncho-like member 30 and thereby protectively cover the motorcycle-like vehicle and the rider simultaneously.

Figure 4:
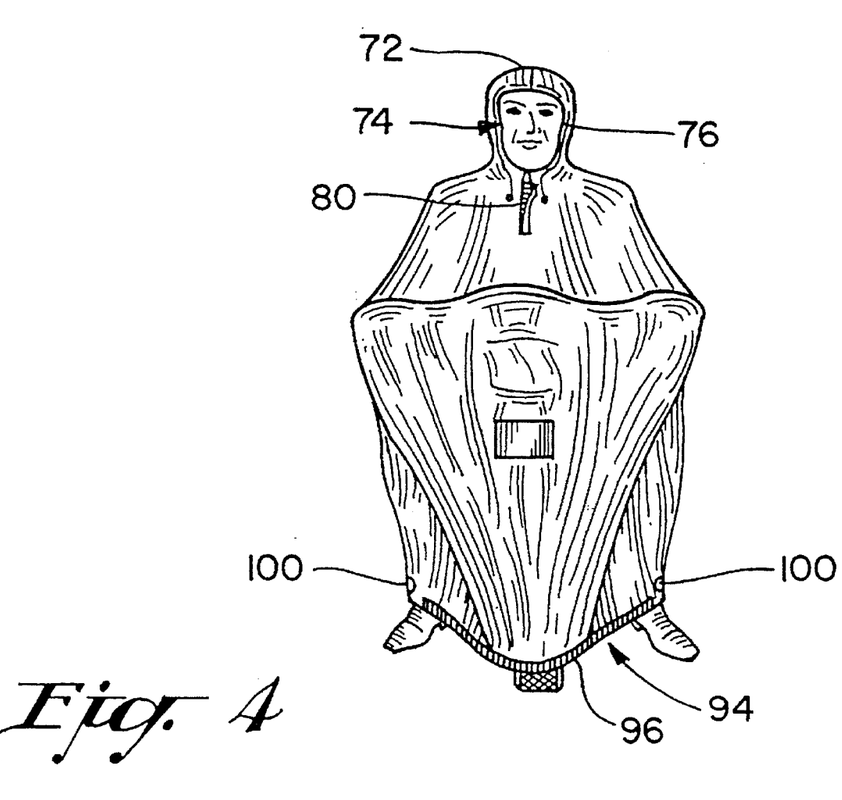
FIG. 4 is a front view of the embodiment shown in FIG. 1 and with a front opening of a hood drawn tight about the rider's head.
Figure 5:
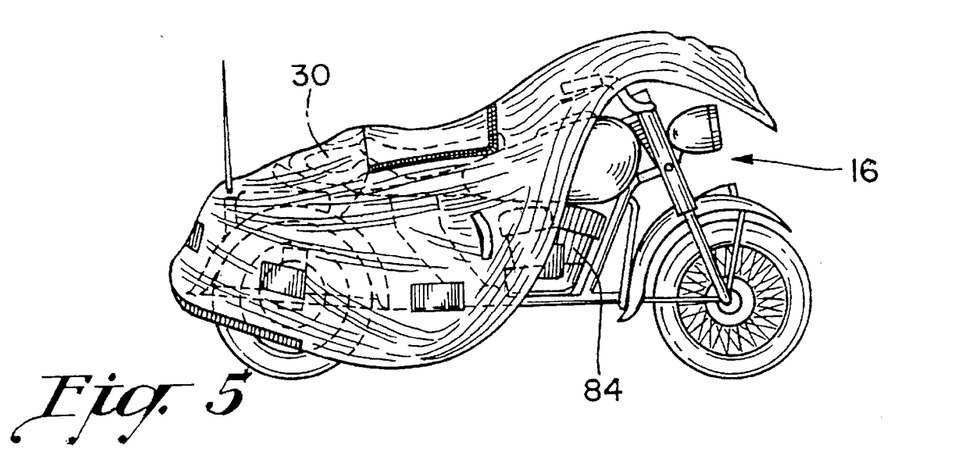
FIG. 5 is a right side view of the embodiment shown in FIG. 1 as the cover structure is being positioned to cover the vehicle and with the rider aperture flap in a sealed closed position.
Figure 6:
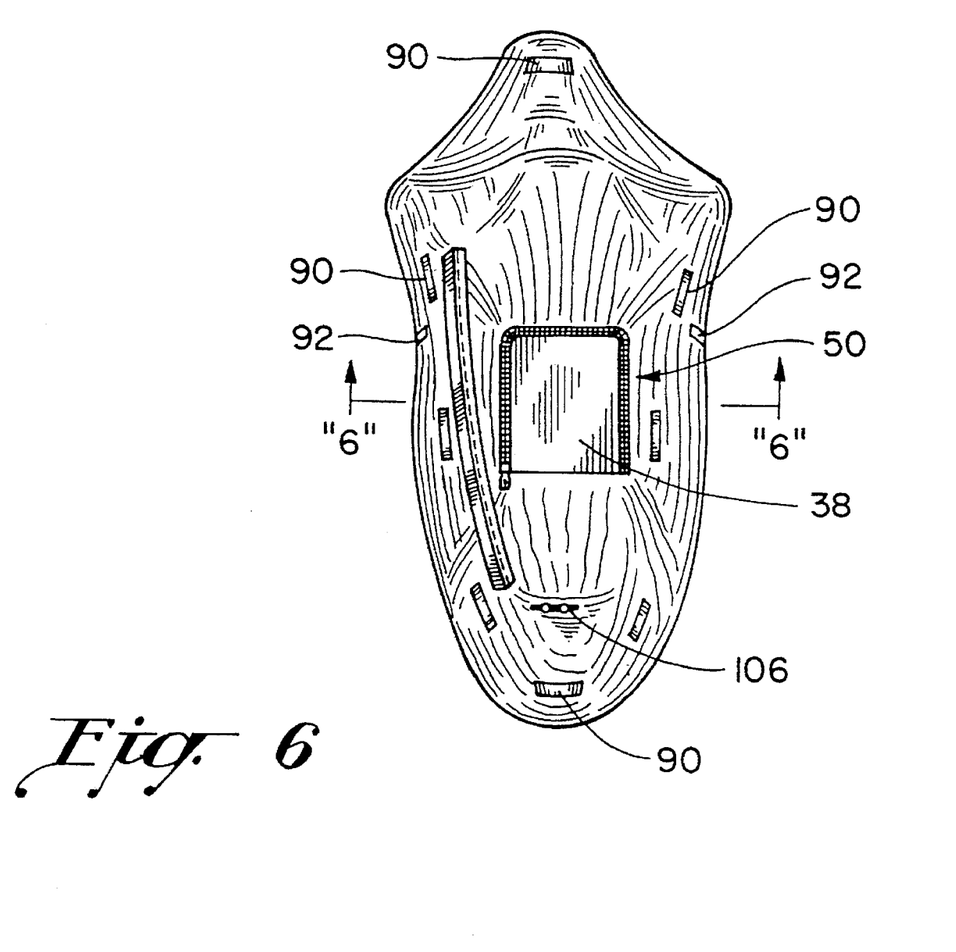
FIG. 6 is a top view of the embodiment shown in FIG. 1, now without a rider on the vehicle and with the rider aperture flap in a sealed closed position.

Yet a further feature of the preferred embodiment of my invention that I have provided is the poncho-like member 30 including a hood 72 for covering a head portion 74 of the rider. The hood should have a front opening 76 to permit access of the rider's face to an outside environment. Also, the hood should include a water tight third zipper 80 or some type of water tight sealing mechanism. The zipper or mechanism is located in the poncho-like member adjacent the front opening and extends a distance vertically down the poncho-like member, as shown in FIG. 4. The zipper 80 must be operable from both an inside and an outside position relative to the poncho-like member since the rider's hand cannot operate the zipper from the outer position when the rider is seated underneath the cover structure. Also, the third zipper thereby enables the hood to be draw around the head portion as desired.

Another feature of the preferred embodiment of my invention I contemplate is the vehicle cover section 12 including a heat resistant material portion 82 located longitudinally along the underneath side 26 of the vehicle cover section. The heat resistant material portion 82 shields the vehicle cover section from an engine 84 and an exhaust system of the motorcycle-like vehicle.

The heat resistant material portion 82 is a near critical feature of my invention in order to insure safe and non-damaging use of the vehicle cover structure when the cover is put over a recently driven vehicle having a hot engine and exhaust system. Moreover, one of the primary intended uses of my invention is for the vehicle rider on the open road who suddenly encounters weather elements and needs to quickly protect him or her self and the vehicle from the elements. In this situation, the vehicle engine and exhaust system will likely be dangerously hot when covered by the vehicle cover structure. Also, considering the situation where a vehicle rider has just finished riding the vehicle and desires to cover the vehicle immediately for storage purposes, with my invention here the rider can do so without the risk of damaging the vehicle cover structure because the recently driven vehicle still has a hot engine and exhaust system.

A further aspect to the heat shielding features of my invention includes at least one vent opening 92 located in the vehicle cover section adjacent the engine to enable heat from the engine of the motorcycle-like vehicle to escape from the underneath side of the vehicle cover section to the outside environment.

I have also provided a visual safety feature to the preferred embodiment of my invention which comprises at least one reflector or reflector material portion 90 attached at the outer side 25 of the vehicle cover section. The reflector material portion 90 serves to warn passer-bys of the location and stationary condition of the motorcycle-like vehicle positioned under the flexible weather protective vehicle cover structure with and without a rider thereon. Thus, this visual safety feature is realistically a mandatory requirement when the vehicle is pulled off to the side of a road and the rider is underneath the vehicle cover structure waiting out a storm or other weather condition, as other motorists speed pass the covered stationary vehicle and rider. Also, the visual safety feature serves to aid in detecting the vehicle when parked in a parking lot.

Yet another feature I have provided in the vehicle cover section is a sealable rear opening 103 provided in the vehicle cover section to enable at least one antenna 104 attached to the motorcycle-like vehicle to protrude through the vehicle cover section. In operation, the opening 103 comprises a slit made sealable by a substantially water tight third hook and loop type fastener 106 (the product commonly sold under the trademark "VELCRO" TM) connected coextensive with opposed edges of the slit 103. In this way, the vehicle cover section allows the vehicle cover structure, when the opening 103 is open, to be placed over one or more antenna which are permanently attached to the vehicle. Then, once the vehicle cover structure is assembled over the vehicle the opening can be sealed around the antenna to substantially preventing weather elements from contacting the motorcycle-like vehicle.

The preferred embodiment of my vehicle cover structure is currently contemplated to be constructed of at least the following material. Excellent results are believed to be obtainable when the vehicle cover structure, namely, the vehicle cover section and the rider cover section, are constructed of a high-tech urethane-coated polyester knit fabric that is "downpour repellent" and allows for breathability. For example, one such material is that used to make the motorcycle cover sold by Harley-Davidson Inc, under the model number 98742-96 as found at page 197 of the Harley-Davidson Genuine Motor Accessories And Genuine Motor Parts Catalog. Additionally, the vehicle cover section could have a soft inner finish to the material to make the cover paint and windshield friendly. The soft inner finish may be achieved by having a separate flannel like material integrally connected to an inner surface of the vehicle cover section.

The preferred embodiment of my vehicle cover structure is currently constructed as follows. First, the rider entry door is formed by cutting the elongated slit 52 in the upper edge of a pre-formed vehicle cover section. Next, the door closure member comprising a water tight zipper 60 is connected coextensive with opposite sides of the elongated slit, thereby facilitating opening and reseating of the rider entry door. Then, a slit is cut in the vehicle cover section and opposite edges of the slit are connected to the third hook and loop type fastener 106 thereby forming the sealable rear opening 103.

Next, the rider cover section is formed. At a position overlying the seat of the motorcycle-like vehicle, the vehicle cover section is cut on all sides but one thereby forming the rider aperture 24. The cut vehicle cover section is pulled back to form the rider aperture flap 38 which is integrally connected with the rider aperture edge. Next, the bottom portion 34 of a pre-formed poncho-like member 30 (including the hood 72, front opening 76 and third zipper 80) is sized to correspond to the configuration of the rider aperture edge 36. Then the bottom portion 34 of the poncho-like member is sewn to the rider aperture edge 36, preferably being sewn on the underneath side of the vehicle cover section using a heavy duty thread 44 and making at least double stitch line. It should be understood, however, that other means such as gluing, bonding, forming integrally or the like, could be employed in substitute or in addition to sewing, as long as the end result is a sealingly connected relationship having a substantially water tight characteristic formed between the bottom portion 34 and the edge 36.

Now, the second hook and loop type fastener 68 is connected coextensive with the rider aperture flap and the rider aperture edge to enable opening and sealing of the rider aperture by positioning the rider aperture flap in a sealed closed position when the poncho-like member is located adjacent the underneath side of the vehicle cover section. In this way the rider aperture flap can protectively seal the vehicle cover substantially preventing weather elements from contacting the motorcycle-like vehicle without a rider thereon. Concerning the fastener 68, presently it is intended to overlie the sewn relationship between the bottom portion 34 and the rider aperture edge 36, as shown in FIG. 8. Also, it should be understood that water tight closure members 56 and 66 need not both be the same, as depicted in FIGS. 7 and 8 of the drawings which are merely representative of the particular possible relationships between respective structural members. In fact, in the preferred embodiment of my invention the closure member 56 is the first zipper 60 and the closure member 66 is the second hook and loop type fastener 68.

Finally, the supplemental features and advantages of my vehicle cover structure are included in the vehicle cover structure, in no particular order. Along a bottom edge 94 of the vehicle cover section an elastic band 96 is joined to the vehicle cover section by sewing or the like. The elastic band 96 is preferably joined at a position adjacent the lower half 98 of each of the at least two of the wheels of the vehicle 16. The elastic band serves to resiliently gather the bottom edge about the lower half of each of the at least two of the wheels of the motorcycle-like vehicle when the motorcycle-like vehicle is with or without the rider.

Next, at least a pair of grommets 100 are mounted in the bottom edge on opposite sides of the vehicle cover section. Then, a strap-type fastener 102 is engageable with each of the pair of grommets underlying the motorcycle-like vehicle to secure the vehicle cover section to the motorcycle-like vehicle when the motorcycle-like vehicle is without the rider.

Following this step, the heat resistant material portion 82 is attached to the underneath side of the vehicle cover section adjacent the vehicle engine and exhaust system. Additionally, at least one vent opening 92 is cut into the vehicle cover section adjacent the engine to enable heat from the engine of the motorcycle-like vehicle to escape from the underneath side of the vehicle cover section to the outside environment. And last but not least nor all inclusive, the at least one reflector or reflector material portion 90 is attached at the outer side 25 of the vehicle cover section.

To utilize the vehicle cover structure 10 in combination with a vehicle 16 both with and without a rider thereon, first the vehicle cover structure is positioned over the vehicle. This is done by stretching each elastic band 96 over and under the lower half 98 of the adjacent wheel thereto. If the vehicle cover structure 10 is to be used without a rider thereon then the strap-type fastener 102 is connected between each of the pair of grommets to aid in further securing the cover structure 10 to the vehicle 16.

If the vehicle cover structure 10 is to be used with a rider thereon then the rider aperture flap 38 is moved to the open unsealed position, thereby enabling the poncho-like member 30 to be positioned out from under the flap 38 and away from the underneath side 26 of the vehicle cover section. Next, the rider entry door is opened to enable ingress of the rider into the vehicle cover section. The rider positions his or her whole body into the rider cover section as his or her upper torso portion passes through the rider aperture and into the poncho-like member. Then, with the rider's body substantially completely covered by the vehicle cover structure the rider operates the door closure member thereby sealing closed the rider entry door to prevent weather elements from contacting the motorcycle-like vehicle and the rider. As the rider desires, the third zipper can be position to provide ventilation or to draw the hood tight about the head portion.

Figure 9:
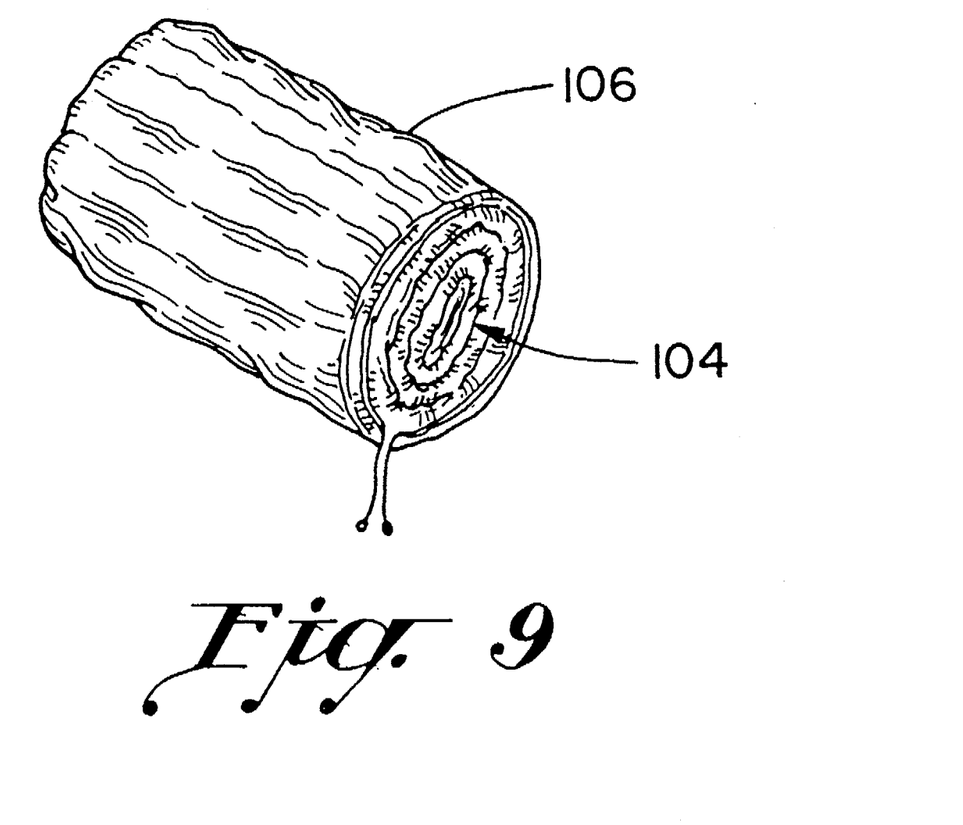
FIG. 9 is a front side perspective view of the preferred embodiment of my flexible weather protective vehicle cover structure compactly stored.

To store the vehicle cover structure, the opposite steps are followed from those required to utilize the vehicle cover structure. Then, as an aid in storing and transporting the vehicle cover structure, I have provided the flexible weather protective vehicle cover structure being collapsible to be compactly stored in a rolled position 104 inside a container 106.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. In combination, a flexible weather protective vehicle cover structure including a vehicle cover section and a rider cover section for a stationary at least two-wheeled motorcycle-like vehicle with and without a rider thereon, the vehicle cover section comprising
  the vehicle cover section being sized and positionable to cover the motorcycle-like vehicle,
  the vehicle cover section having an outer side and an underneath side,
  a rider entry door located in an upper edge of the vehicle cover section to enable ingress and egress of the rider,
  the rider entry door includes a water tight door closure member for opening and sealing the rider entry door when the flexible weather protective vehicle cover structure is positions to cover the motorcycle-like vehicle,
  the water tight door closure member is from the group consisting of a first hook and loop type fastener and a first zipper,
  the water tight door closure member being operable from the outer side and the underneath side of the vehicle cover section, the rider cover section comprising
  a rider aperture located in the vehicle cover section at a position overlying a seat of the motorcycle-like vehicle when the flexible weather protective vehicle cover structure is positioned to cover the motorcycle-like vehicle,
  a rider aperture edge located adjacent a circumference of the rider aperture,
  a poncho-like member sized to fit over an upper torso portion of the rider,
  the poncho-like member including a bottom portion,
  the bottom portion of the poncho-like member circumferentially sealingly connected to the rider aperture edge,
  the rider aperture being adapted to permit entry of the rider from the underneath side of the vehicle cover section into the poncho-like member and thereby protectively cover the motorcycle-like vehicle and the rider,
  a rider aperture flap,
  the rider aperture flap sized to cover the rider aperture,
  the rider aperture flap being connected adjacent the rider aperture edge,
  a water tight flap closure member connected coextensive with the rider aperture flap and the rider aperture edge to enable opening and sealing of the rider aperture by positioning the rider aperture flap in a sealed closed position when the poncho-like member is located adjacent the underneath side of the vehicle cover section, and
  the water tight flap closure member being from the group consisting of a second hook and loop type fastener and a second zipper.

2. The combination of claim 1, wherein the vehicle cover section includes a heat resistant material portion located longitudinally along the underneath side of the vehicle cover section for shielding the vehicle cover section from an engine and an exhaust system of the motorcycle-like vehicle and at least one vent opening located in the vehicle cover section adjacent the engine to enable heat from the engine of the motorcycle-like vehicle to escape from the underneath side of the vehicle cover section to an outside environment.

3. The combination of claim 2, wherein the vehicle cover section includes a bottom edge and elastic gathering means connected to the bottom edge for securing the vehicle cover section to the motorcycle-like vehicle by resiliently gathering the bottom edge about a lower half of at least two of the wheels of the motorcycle-like vehicle when the motorcycle-like vehicle is with and without the rider, a pair of grommets located in the bottom edge and a strap-type fastener engageable with each of the pair of grommets, the strap-type fastener underlying the motorcycle-like vehicle to thereby further secure the vehicle cover section to the motorcycle-like vehicle when the motorcycle-like vehicle is without the rider.

4. The combination of claim 3, wherein reflector means is attached at the outer side of the vehicle cover section for warning passer-bys of the location and stationary condition of the motorcycle-like vehicle positioned under the flexible weather protective vehicle cover structure with and without a rider thereon and the combination further including a container where the flexible weather protective vehicle cover structure is collapsible and can be compactly stored in a rolled position inside the container.

5. The combination of claim 4, wherein the poncho-like member includes a hood for covering a head portion of the rider, the hood having a front opening for permitting access of the rider's face to an outside environment, a third zipper located in the poncho-like member adjacent the front opening and extending a distance vertically down the poncho-like member, the third zipper being operable from both an inside and an outside position relative to the poncho-like member and the third zipper enabling the hood to be draw around the head portion as desired.

6. In a flexible weather protective vehicle cover structure including a vehicle cover section sized and positionable to cover the motorcycle-like vehicle for protectively covering a stationary at least two-wheeled motorcycle-like vehicle with and without a rider thereon, the improvement comprising:
  the vehicle cover section having an outer side and an underneath side,
  rider entry door means located in the vehicle cover section for opening and sealing the vehicle cover section to enable ingress and egress of the rider when the flexible weather protective vehicle cover structure is positioned to cover the motorcycle-like vehicle,
  a rider cover section,
  the rider cover section including a rider aperture located in the vehicle cover section at a position overlying a seat of the motorcycle-like vehicle when the flexible weather protective vehicle cover structure is positioned to cover the motorcycle-like vehicle,
  a rider aperture edge located adjacent a circumference of the rider aperture,
  a poncho-like member sized to fit over an upper torso portion of the rider, the poncho-like member including a bottom portion, the bottom portion of the poncho-like member circumferentially sealingly connected to the rider aperture edge, the rider aperture being adapted to permit entry of the rider from the underneath side of the vehicle cover section into the poncho-like member and thereby protectively cover the motorcycle-like vehicle and the rider, and rider aperture sealing means enabling opening and sealing of the rider aperture to prevent weather elements from contacting the motorcycle-like vehicle when the flexible weather protective vehicle cover structure is positioned to cover the motorcycle-like vehicle without a rider thereon.

7. The flexible weather protective vehicle cover structure of claim 6, wherein the rider entry door means comprises an elongated slit located in an upper edge of the vehicle cover section, the elongated slit having a pair of opposed slit edges, a water tight door closure member from the group consisting of a first hook and loop type fastener and a first zipper, the water tight door closure being connected coextensive with the pair of opposed slit edges, and the door closure member being operable from both the outer side and the underneath of the vehicle cover section.

8. The flexible weather protective vehicle cover structure of claim 7, wherein a rider entry door flap is connected adjacent the elongated slit to aid in sealing closed the rider entry door when the rider entry door is positioned to seal closed the vehicle cover section, and the rider entry door flap being positioned to aesthetically hide the elongated slit and door closure member.

9. The flexible weather protective vehicle cover structure of claim 6, wherein the rider aperture sealing means comprises a rider aperture flap, a water tight flap closure member from the group consisting of a second hook and loop type fastener and a second zipper and the water tight flap closure member being connected coextensive with the rider aperture flap and the rider aperture edge thereby enabling the rider aperture the poncho-like member in a sealed closed position when the poncho-like member is located adjacent the underneath side of the vehicle cover section.

10. The flexible weather protective vehicle cover structure of claim 6, wherein the poncho-like member includes a hood for covering a head portion of the rider, the hood having a front opening for permitting access of the rider's face to an outside environment, a third zipper located in the poncho-like member adjacent the front opening and extending a distance vertically down the poncho-like member, the third zipper being operable from both an inside and an outside position relative to the poncho-like member and the third zipper enabling the hood to be draw around the head portion as desired.

11. The flexible weather protective vehicle cover structure of claim 6, wherein the vehicle cover section includes a heat resistant material portion located longitudinally along the underneath side of the vehicle cover section for shielding the vehicle cover section from an engine and an exhaust system of the motorcycle-like vehicle.

12. The flexible weather protective vehicle cover structure of claim 6, wherein reflector means is attached at the outer side of the vehicle cover section for warning passer-bys of the location and stationary condition of the motorcycle-like vehicle positioned under the flexible weather protective vehicle cover structure with and without a rider thereon.

13. The flexible weather protective vehicle cover structure of claim 11, wherein at least one vent opening is located in the vehicle cover section adjacent the engine to enable heat from the engine of the motorcycle-like vehicle to escape from the underneath side of the vehicle cover section to an outside environment.

14. The flexible weather protective vehicle cover structure of claim 6, wherein the vehicle cover section includes a bottom edge and elastic gathering means connected to the bottom edge for securing the vehicle cover section to the motorcycle-like vehicle by resiliently gathering the bottom edge about a lower half of at least two of the wheels of the motorcycle-like vehicle when the motorcycle-like vehicle is with and without the rider.

15. The flexible weather protective vehicle cover structure of claim 14, wherein a pair of grommets are located in the bottom edge and a strap-type fastener is engageable with each of the pair of grommets, the strap-type fastener underlying the motorcycle-like vehicle and thereby further securing the vehicle cover section to the motorcycle-like vehicle when the motorcycle-like vehicle is without the rider.

16. The flexible weather protective vehicle cover structure of claim 6, wherein a sealable rear opening is provided in the vehicle cover section to enable an antenna attached to the motorcycle-like vehicle to protrude through the vehicle cover section while substantially preventing weather elements from contacting the motorcycle-like vehicle.

17. The flexible weather protective vehicle cover structure of claim 6, further including a container and the flexible weather protective vehicle cover structure being collapsible to be compactly stored in a rolled position inside the container.

18. A flexible weather protective vehicle cover structure for protectively covering a stationary at least two-wheeled motorcycle-like vehicle with and without a rider thereon, comprising a vehicle cover section sized and positionable to cover the motorcycle-like vehicle, the vehicle cover section having an outer side and an underneath side, rider entry door means located in the vehicle cover section for opening and sealing the vehicle cover section to enable ingress and egress of the rider when the flexible weather protective vehicle cover structure is positioned to cover the motorcycle-like vehicle, a rider cover section, the rider cover section including a rider aperture located in the vehicle cover section at a position overlying a seat of the motorcycle-like vehicle when the flexible weather protective vehicle cover structure is positioned to cover the motorcycle-like vehicle, rider aperture edge located adjacent a circumference of the rider aperture, a poncho-like member sized to fit over an upper torso portion of the rider, the poncho-like member including a bottom portion, the bottom portion of the poncho-like member circumferentially sealingly connected to the rider aperture edge, and the rider aperture being adapted to permit entry of the rider from the underneath side of the vehicle cover section into the poncho-like member and thereby protectively cover the motorcycle-like vehicle and the rider.

19. The flexible weather protective vehicle cover structure of claim 18, wherein the vehicle cover section includes a heat resistant material portion located longitudinally along the underneath side of the vehicle cover section for shielding the vehicle cover section from an engine and an exhaust system of the motorcycle-like vehicle and at least one vent opening located in the vehicle cover section adjacent the engine to enable heat from the engine of the motorcycle-like vehicle to escape from the underneath side of the vehicle cover section to an outside environment.

20. The flexible weather protective vehicle cover structure of claim 19, wherein reflector means is attached at the outer side of the vehicle cover section for warning passer-bys of the location and stationary condition of the motorcycle-like vehicle positioned under the flexible weather protective vehicle cover structure with and without a rider thereon and a container where the flexible weather protective vehicle cover structure is collapsible and can be compactly stored in a rolled position inside the container.

* * * * *